April 21, 1953
C. W. WATSON
2,635,919
DUMPING TRAILER AND ENDGATE CONTROL THEREFOR
Filed July 20, 1949
4 Sheets-Sheet 1
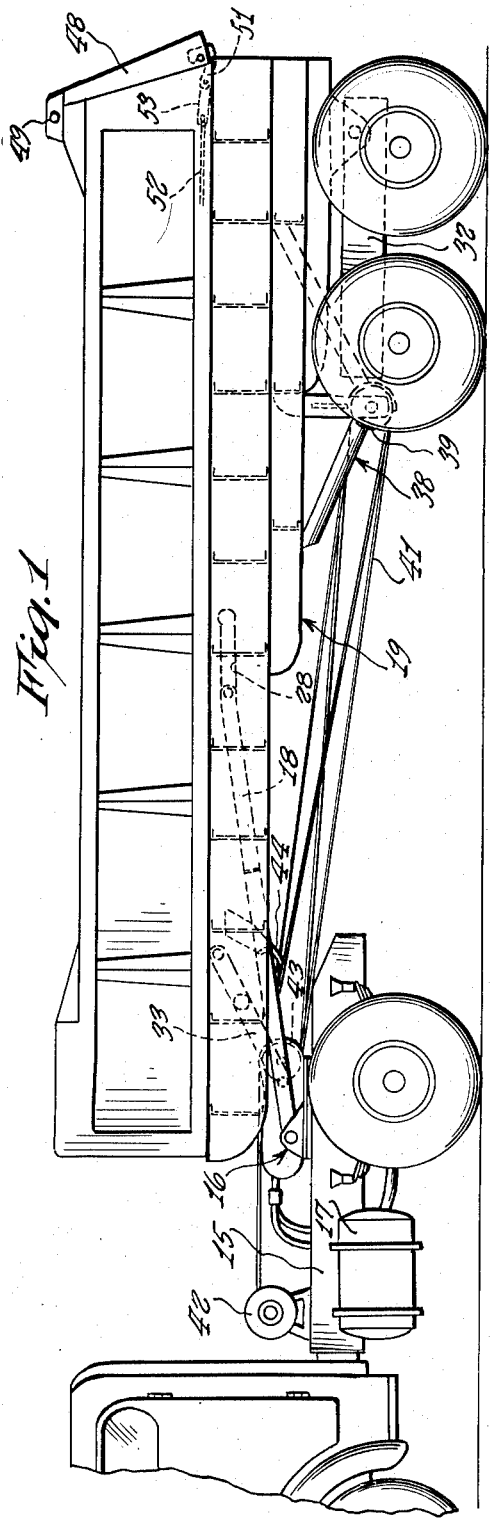
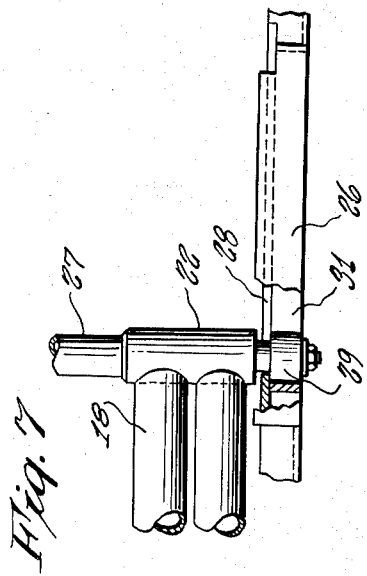
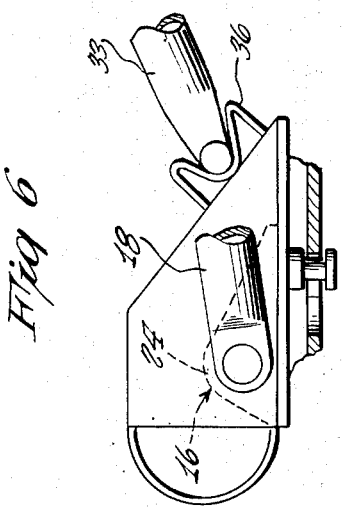
INVENTOR.
Charles W. Watson
BY
W. Lee Helms
ATTORNEY

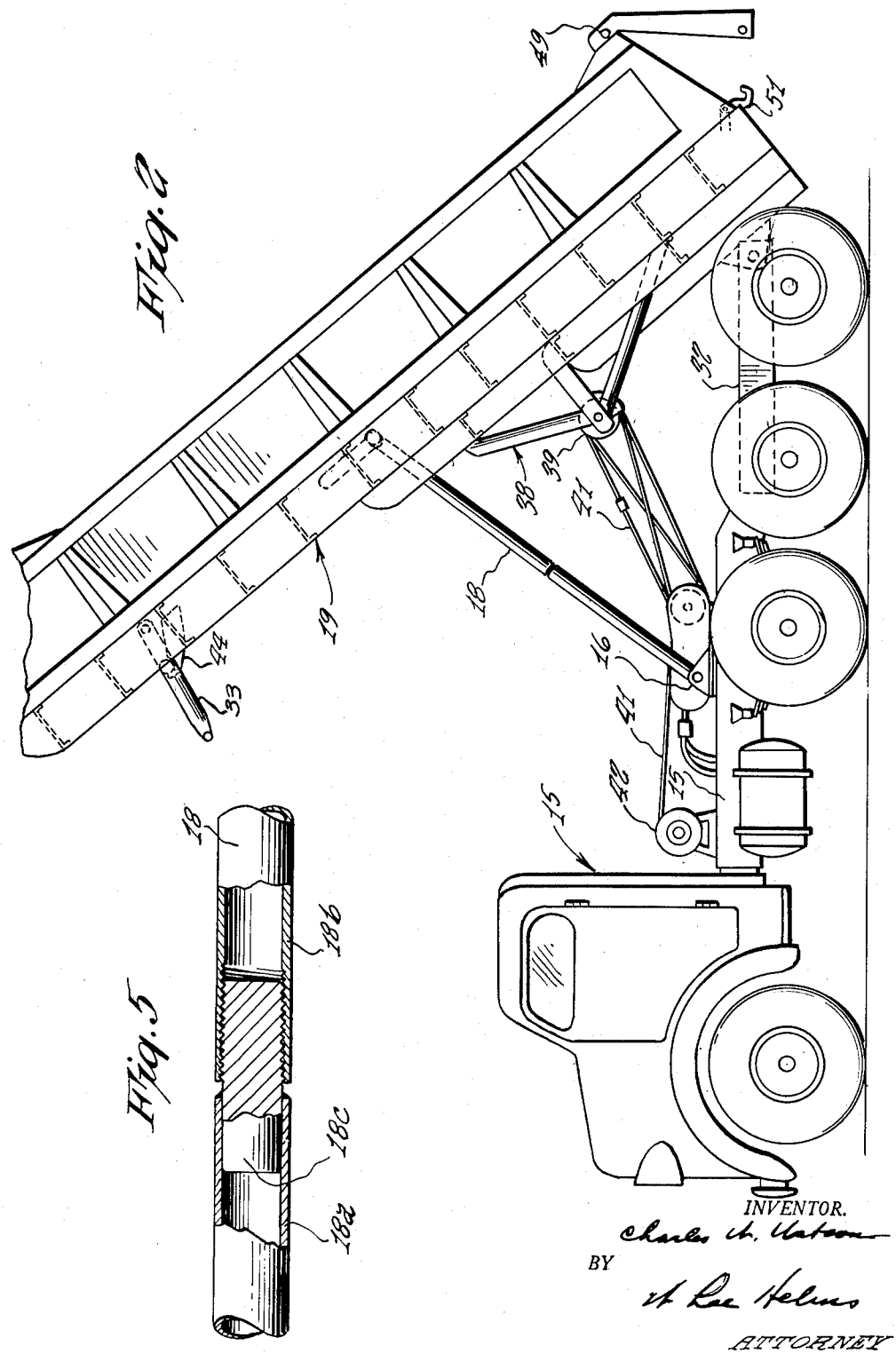

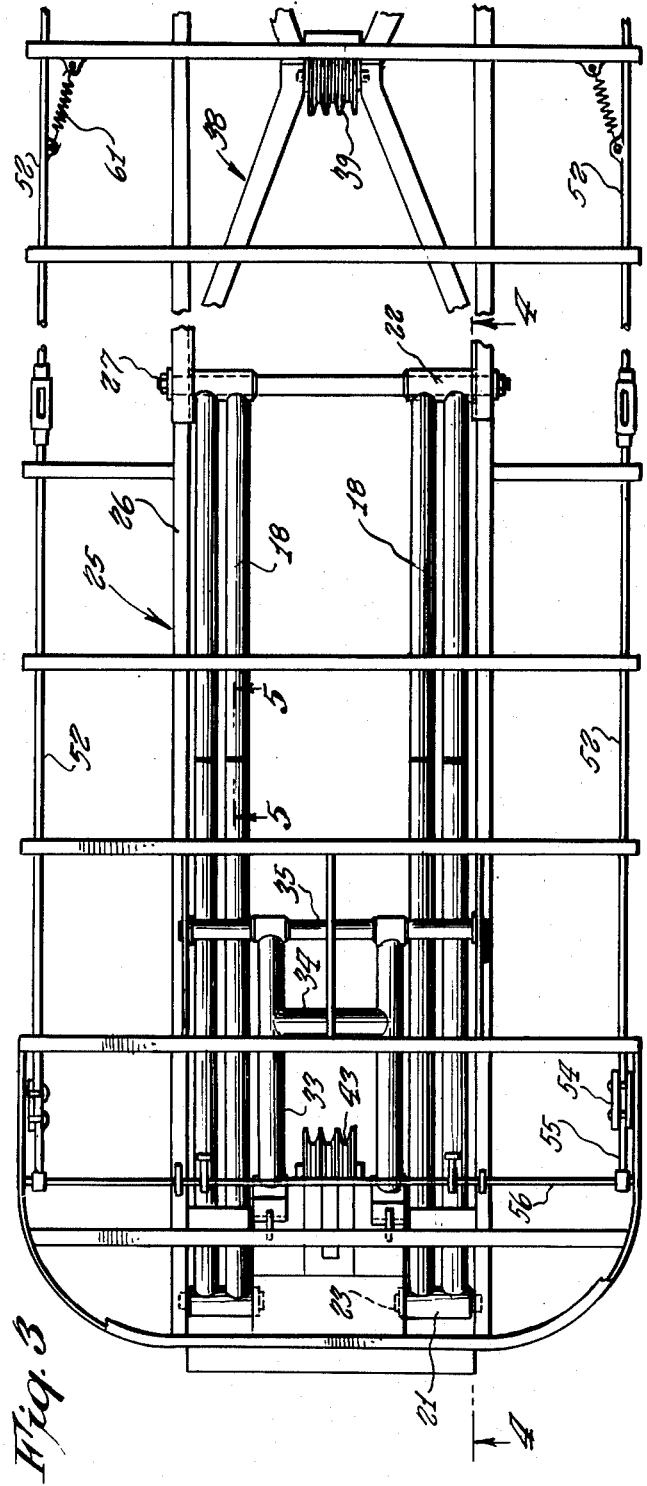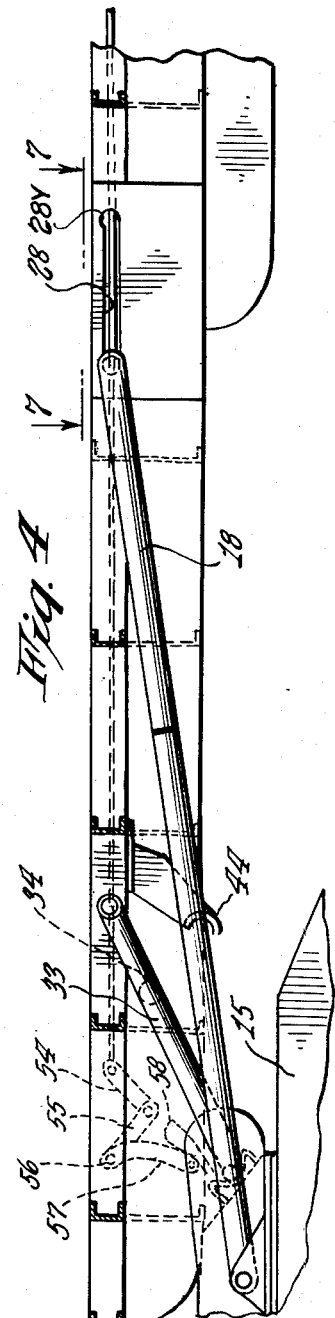

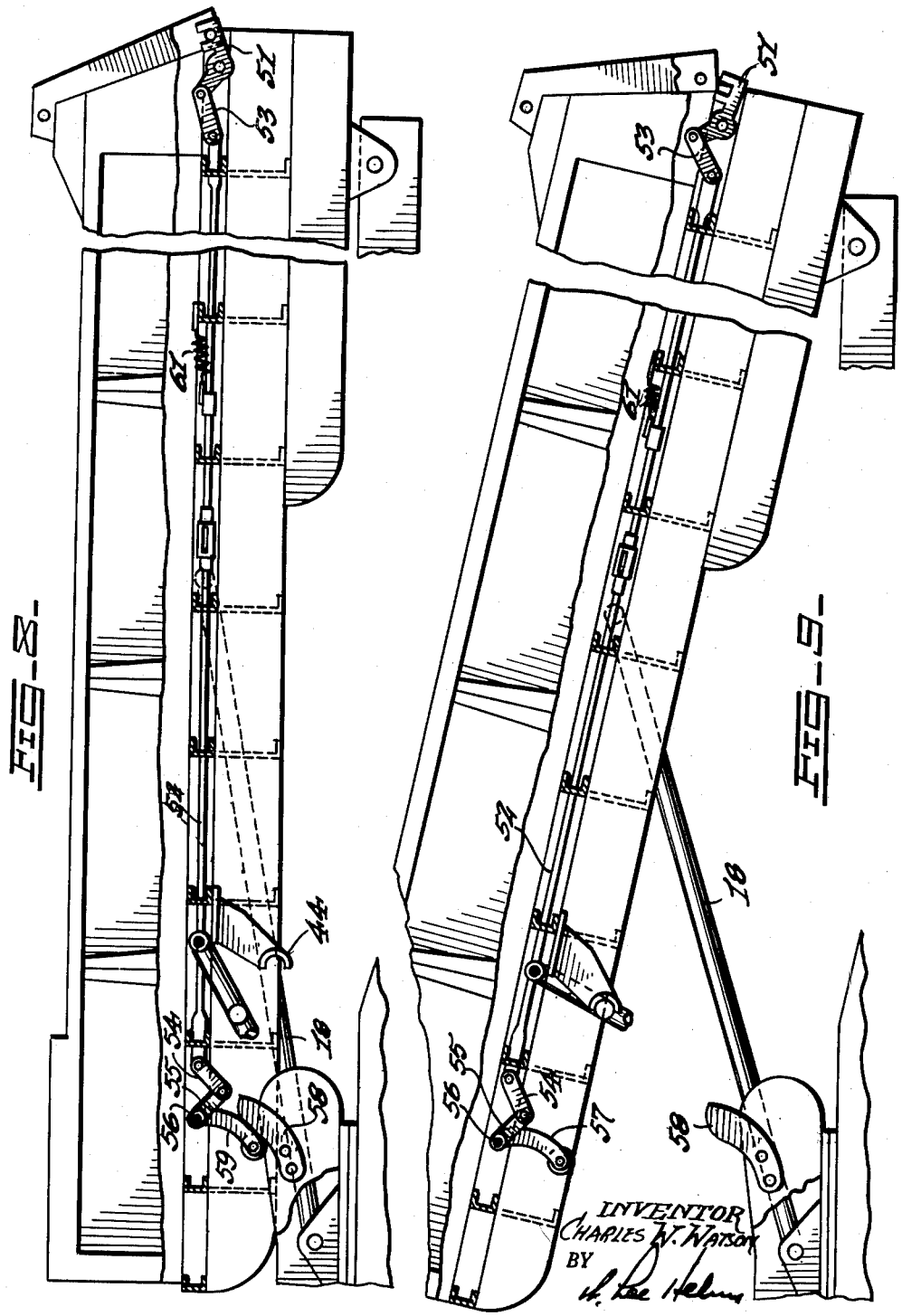

Patented Apr. 21, 1953

2,635,919

UNITED STATES PATENT OFFICE 2,635,919

DUMPING TRAILER AND ENDGATE CONTROL THEREFOR

Charles W. Watson, Minden, La.

Application July 20, 1949, Serial No. 105,815

3 Claims. (Cl. 298—20)

This invention relates to dumping trailer construction.

It is an object of the present invention to provide a dumping trailer construction wherein the trailer can be tilted as it is drawn toward the tractor to effect the dumping action of the trailer and to distribute the contents thereof without having to move the tractor and merely by the forward movement of the trailer toward the tractor so that the contents will be distributed upon the ground and wherein there is provided lifting means for the elevation of the forward part of the trailer dump body which can effectively start the lifting action of the forward part of the truck body and wherein upon continued movement of the trailer toward the tractor longer lifting elements are automatically brought into play.

Other objects of the present invention are to provide a dumping trailer construction which is simple, inexpensive to manufacture, operated by simple mechanism, has a minimum number of parts, wherein the lifting bars are conveniently provided under the dumping trailer and the connection of the same with the rotary fifth wheel assembly of the tractor can be effected to properly distribute the stresses throughout the length of the lifting bars, wherein the lifting bars themselves are provided with anti-torsional means to prevent the distribution of torsional stresses to the dumping trailer body, wherein the lifting linkage is compact and rugged, and consumes little space, and efficient in operation.

For other objects and for a better understanding of the invention, reference may be had to the following detailed description taken in connection with the accompanying drawing, in which Fig. 1 is a side elevational view of the dumping trailer embodying the features of the present invention and of a tractor for carrying the forward end of the trailer.

Fig. 2 is a side elevational view of the trailer body elevated to a dumping position and the supporting wheels being brought forwardly to a location immediately behind the tractor wheels.

Fig. 3 is a fragmentary and skeletonized plan view of the forward part of the trailer body frame and of the lifting bars thereof.

Fig. 4 is a longitudinal sectional view of the dumping body frame taken generally on line 4—4 of Fig. 3.

Fig. 5 is an enlarged detail sectional view taken through one of the lifting bars and on line 5—5 of Fig. 3.

Fig. 6 is an enlarged fragmentary elevational view of the forward end of the dump body frame and looking upon the connection of the lifting bars therewith.

Fig. 7 is a fragmentary view taken generally on line 7—7 of Fig. 4.

Fig. 8 is a horizontal view of the truck body, broken away in part, and showing the mechanism of opening the tail gate.

Fig. 9 is a side view, broken away in part, showing the truck body in a partly elevated position and further showing the manner of opening the tail gate.

Referring now to the figures, 15 represents a tractor having the usual fifth wheel assembly 16 on which is mounted a compressed air tank 17 for the delivery of compressed air to parts of the tractor body to be used in the operation of the same. Pivoted upon this assembly are long lifting bars 18 arranged in pairs beneath a dumping trailer 19. Each pair of lifting bars are coupled together at their forward and rear ends by bearing sleeves 21 and 22 respectively. The bearing sleeves 21 are made secure by pivot pins 23 to upstanding portions 24 of the fifth wheel assembly. The dump trailer body has a frame 25 including longitudinally extending frame pieces 26 laterally spaced from one another and having a shaft 27 connected between them intermediate the length of the trailer body and to which there is pivotally connected the bearing sleeves 22 of the lifting bars 18.

Preferably, each of the lifting bars 18 are made in two parts, as seen in Fig. 5. These two parts are indicated at 18a and 18b. The part 18a has a threaded pin 18c welded thereto and the part 18b is internally threaded to receive the threaded pin whereby any torsional forces placed upon the lifting bars 18 will not be transmitted throughout the length of the lifting bar. Such stresses are broken up by the turning of the part 18a relative to the part 18b. The shaft 27 rides respectively in elongated slots 28 provided with rearward notches 28y in the frame pieces 26. When the dump body is in the lowered position, the shaft 27 will lie in the forward ends of the elongated slots 28. The shaft ends are preferably provided with rollers 29, Fig. 7, which may traverse bracket formations 31 on the frame pieces 26.

The trailer body 19 is supported on a four wheel truck arrangement, indicated generally at 32, for pivotal movement with respect thereto.

To obtain the proper starting force for the lifting of the trailer dump body at its forward end from the wheel assembly 16, there are provided two short lifting bars 33 held in transverse relationship by a transverse bar 34 and pivoted upon a transverse shaft 35 extending between longitudinally extending frame pieces 26. The forward ends of the short lifting bars 33 abut with depressed wear plates 36 having depressions 36$x$ therein respectively and carried upon the fifth wheel attaching assembly 16, Fig. 6. The first lifting action as the trailer body is pulled longitudinally forwardly toward the tractor, by mechanism to be presently described, is on the short lifting bars or struts 33.

Near the rear of the trailer dump body there depends a strut structure 38 having pulley wheels 39 thereon over which a cable 41 extends. This cable is connected to a winch 42 on the tractor body and over pulleys 43. As the winch 42 is tightened or turned by power means provided by the tractor, the dump trailer body will be brought forwardly on the tractor. Immediately lifting action by the forward end of the trailer body is effected through the short lifting bars 33 and upon the depressed wear plates 36. Continued forward movement brings the shaft 27 of the long lifting bars 18 to the end of the slots 28 so that the lifting action is then picked up by the lifting bars 18 to finally bring the lifting body to its fully elevated position.

Since the short lifting bars 33 are free to leave the depressed wear plates 36, they will be disconnected as the load is picked up by the long lifting bars 18. To prevent the rearward displacement of the short lifting bars 33, a hook bracket 44 depends from the trailer body and receives the transverse spacing portion 34 of the lifting bars. The lifting bars will accordingly be held in an extended position on the body when the body is elevated and in the manner as shown in Fig. 2. As the body is lowered as a result of the release of the cable 41 from the winch 42, by the longitudinal forward movement of the tractor, the body 19 will be lowered so that the short lifting bars 33 again engage against the depressed wear plates 36 and made free of the hook bracket 44.

On the rear of the trailer body is a gate 48 pivoted at its upper end and indicated at 49 and normally retained in a closed position by a hook 51. This hook is connected to a rod 52 through a link 53 and the rod extends forwardly through the trailer frame for connection with a link 54 to a bell crank arm 55 carried on the end of a transverse shaft 56 pivoted in the frame structure and having a depending operating arm 57 engageable with a cam 58 upon the downward movement of the trailer body whereby to positively pull forwardly the hook latch 51 to retain the gate 48 closed. Upon release of the dump body, the forward end of the same is elevated, the operating arm 57 for the latch will be made free of the cam 58. Tension springs 61 extending between the respective rods 52 at the opposite sides of the body frame will serve to pull rearwardly the rods 52 to release the latch 51 from the gate 48. This action is accordingly automatic with the lifting of the dump body whereby the operator need not leave the tractor cab to effect its operation or to open the gate 48.

It should now be apparent that there has been provided a trailer dumping arrangement wherein both short and long lifting bars are utilized in succession wherein the maximum lifting strain at the beginning of the lifting movement is placed upon short rigid bars and at the latter part of the lifting movement is carried by long lifting bars.

While various changes may be made in the detail construction, it shall be understood that such changes shall be within the spirit and scope of the present invention as defined by the appended claims.

What is claimed is:

1. The tractor-trailer truck combination comprising a tractor body having a fifth wheel assembly, a trailer body having rear supporting wheels and adapted to be pivotally connected to said tractor body, a winch and pulley connected to said tractor operatively attached by cables to a pulley connected to said trailer whereby operation of the winch winds the cable about the winch spindle thereby drawing the trailer toward the tractor, abutments provided by the said fifth wheel assembly of said tractor body, a plurality of short lifting arms attached to a trailer frame and adapted to engage said abutments and a plurality of long lifting bars pivotally connected to said fifth wheel assembly and slidably-pivotally connected to a trailer frame through the slots on both sides of the trailer, said slots having notched ends in the rear therein, whereby forward movement of the trailer by the winding up of said cable on said winch effects engagement of the ends of said lifting arms onto the said abutments thereby producing an initial thrust upward of the forward end of said trailer, and wherein further winding-up of the cable actuates the long lifting bars to receive the continuing upward thrust of the forward end of the trailer causing the trailer means of said lifting bars to slide in their slots to the notched ends thereof.

2. The combination of claim 1 wherein the long lifting bars consist of two tubular members connected by a screwable connector one end of which is welded to one of said tubular members and wherein said plurality of short lifting arms are integrally connected to one another by a tubular connector, said lifting arms being arrested in their pivotal motion after leaving said abutments by a hook bracket adapted to re-locate the ends of said arms into said abutments on the lowering of the front end of said trailer.

3. The combination of claim 1 wherein said trailer is provided with a depending gate having an over-head pivot and locked at its base to a catch-hook latch having a spring operated link assembly connected by a longitudinal rod through a belt-crank linkage to an operating arm, said operating arm being adapted to slidably engage a cam surface fixed to said fifth wheel assembly, whereby upward slide movement of said operating arm against said cam actuates said bell-crank linkage which in turn activates the spring operated link assembly to release said catch from locking engagement with said hook.

CHARLES W. WATSON.

References Cited in the file of this patent

UNITED STATES PATENTS

| Number | Name | Date |
|---|---|---|
| 1,652,262 | Walter | Dec. 13, 1927 |
| 1,682,882 | Biszantz | Sept. 4, 1928 |
| 2,018,838 | Connors | Oct. 29, 1935 |
| 2,309,787 | Quintin et al. | Feb. 2, 1943 |
| 2,319,840 | Barrett | May 25, 1943 |
| 2,517,933 | Schonrock | Aug. 8, 1950 |
| 2,542,795 | Clement et al. | Feb. 20, 1951 |